United States Patent [19]

Mills et al.

[11] Patent Number: 5,162,128
[45] Date of Patent: * Nov. 10, 1992

[54] FRUIT JUICE PLUS CITRUS FIBER FROM PULP

[75] Inventors: Susie H. Mills, Fort Thomas, Ky.; Robert E. Tarr, Cincinnati, Ohio

[73] Assignee: The Procter & Gamble Company, Cincinnati, Ohio

[ * ] Notice: The portion of the term of this patent subsequent to Apr. 28, 2009 has been disclaimed.

[21] Appl. No.: 609,972

[22] Filed: Nov. 6, 1990

[51] Int. Cl.⁵ .................................. A23L 2/02
[52] U.S. Cl. .................................. 426/599; 426/590
[58] Field of Search ..................... 426/599, 590

[56] References Cited

U.S. PATENT DOCUMENTS

| | | | |
|---|---|---|---|
| Re. 14,633 | 4/1919 | Kern | 426/599 |
| 3,083,104 | 3/1963 | Celmer | 426/599 |
| 3,634,128 | 1/1972 | Bolin | 426/599 |
| 4,160,849 | 7/1979 | Huchette | 426/599 |
| 4,163,807 | 8/1979 | Jackman | 426/599 |
| 4,374,865 | 2/1983 | Strobel | 426/599 |
| 4,433,000 | 2/1984 | De Leon | 426/599 |
| 4,436,755 | 3/1984 | Perdomini | 426/599 |
| 4,569,853 | 2/1986 | Strobel | 426/599 |
| 4,690,827 | 9/1987 | Kupper | 426/599 |
| 4,946,702 | 8/1990 | Stipp | 426/599 |
| 4,971,811 | 11/1990 | Strobel | 426/599 |
| 4,975,293 | 12/1990 | Hicks | 426/599 |
| 4,988,530 | 1/1991 | Hoersten | 426/599 |

FOREIGN PATENT DOCUMENTS

| | | | |
|---|---|---|---|
| 0296144 | 12/1988 | European Pat. Off. | 426/599 |
| 2087212 | 5/1982 | United Kingdom | 426/599 |

*Primary Examiner*—Carolyn Paden
*Attorney, Agent, or Firm*—Rose Ann Dabek; Jerry J. Yetter; Richard C. Witte

[57] ABSTRACT

This invention relates to fruit juice product, and in particular to a citrus juice product which has a high total dietary fiber content. The fiber is derived from pulp juice sacs of citrus fruit and does not have any papery off-flavors or gritty taste. The juice product is not viscous and does not gel.

20 Claims, No Drawings 5,162,128

FRUIT JUICE PLUS CITRUS FIBER FROM PULP

TECHNICAL FIELD

This invention relates to fruit juice product, and in particular to citrus juice products which have a high fiber content yet, do not have any papery off-flavors or gritty mouthfeel. The fiber is a citrus fiber made from dried, washed pulp with a particle size of less than 50 microns.

BACKGROUND OF THE INVENTION

Fruit and vegetable juice consumption continues to increase in part because of technological change in juice processing and concentration methods. Flash pasteurization, improved thermal concentrating, freeze concentrating, blending, freezing, and drying or crystallization all contributed to this growth by providing better quality, better tasting and higher purity juice products which are more convenient to use. The current health awareness by consumers has also contributed to the consumption of fruit juices and other natural beverages.

The challenge of producing beverages which are acceptable to a broad range of consumers involves making a unique product having an acceptable flavor and aroma, acceptable appearance and satisfactory mouthfeel. The aroma and flavor ingredients along with the amount of pectin, pulp and fiber in beverages affect the flavor and mouthfeel characteristics of the beverage.

Fiber has been shown to be an important part of the human diet. Consumption of both soluble and insoluble fibers are believed to be important in lowering blood cholesterol levels and in improving the overall function of the bowels. There is also a belief that fiber helps to prevent intestinal cancer.

Problems with adding fiber to beverages are the gelling effect of the soluble fiber and the harsh mouthfeel of the insoluble fiber which is described as gritty. Another problem, particularly with fibers derived from oranges and other citrus products is a papery off-flavor associated with the cellulosic components. In addition, it is well known that pulp adsorbs aroma and flavor ingredients in the beverage. The adsorption of the good volatiles results in a significant deterioration in quality and overall flavor of the beverage. Fiber and pulp can also adsorb bad flavors such as oxidation products or cooked flavors.

Drying citrus pulp can create burnt or cooked flavors in the fiber. For instance, lipids can be oxidized, sugars can be caramelized and amino acids and sugars can undergo browning reactions. Such degradation products can cause off-flavors in a fiber containing beverage made from this pulp. The fiber produced by the grinding method described herein does not have these off-flavors and does not cause excessive gelling or grittiness in the beverage.

It is an object of this invention to produce a fruit juice which contains citrus fiber derived from dried pulp in a nutritionally effective amount, but which does not make the beverage too viscous or gelled, or gritty in texture and which does not introduce a papery, non-caramelized off-flavor to the product.

This and other objects of this invention will become apparent by the description of the invention below.

SUMMARY OF THE INVENTION

The present invention relates to a process for preparing citrus pulp fiber containing fruit or vegetable juice beverages and to the beverages themselves.

The beverage comprises:
  (a) from about 0.5% to about 6.5% citrus pulp fiber by weight having a particle size of less than 50 microns, said fiber being derived from dried citrus pulp;
  (b) from about 5% to about 99.5% juice;
  (c) from 0% to about 60% added sweetener; and
  (d) the remainder, if any, being water.

Preferably the beverage comprises from about 0.002% to about 1% added aqueous and oil essences or other flavorants and from 0.5% to 3% sensible pulp (w/w). Preferably the citrus pulp fiber used herein consists of 20% to 80% total dietary fiber, 13% to 55% of which is soluble fiber, preferably 6% to 25% of the fiber is soluble.

The process for making the beverage comprises:
  (a) adding from about 0.5% to about 6.5%, preferably 0.7% to 2.6%, citrus pulp fiber by weight having a particle size of less than 50 microns, to from about 5% to about 99.5% juice by mixing with a minimum of shear at less than 150of (65° C.) temperature, preferably at from 34° F. (1° C.) to 80° F. (27° C.);
  (b) adding aroma and flavor volatiles to the fiber-containing juice to produce a beverage. Beverage concentrates can also be made.

DETAILED DESCRIPTION OF THE INVENTION

As used herein, the term "pulp fiber" means fiber derived from juice vesicles or juice sacs of citrus fruits. Preferably, this citrus pulp is washed to remove adhering juice solids before being ground. The pulp is dried and then jet milled under special conditions to produce pulp fiber having a particle size of less than 50 microns, preferably wherein 60% to 90% of the particles are less than 30 microns.

Citrus pulp fiber is to be distinguished from pulp which is whole juice sacs, homogenized pulp which is pulp that is homogenized in juice to a very small size (60 microns to 200 microns), and from pectin and methoxylated pectins. Pectins are polycarbohydrate materials which are linked through a glycoside or galactoside linkage. The pectins form a "cloud" in the beverage, making it opaque and viscous. The citrus pulp fiber added to the beverages herein is in addition to the pectin already present in the juice. The fiber is derived from dried and preferably washed citrus pulp. It is also different from dried and ground "rag" which is the cellulosic membrane material of the citrus fruit.

As used herein, the term "sweeteners" includes sugars, for example, glucose, sucrose, and fructose. Sugars also include high fructose corn syrup solids, invert sugar, sugar alcohols, including sorbitol, and mixtures thereof. Artificial or high intensity sweeteners are also included in the term sweetener.

The flavor component of the present invention contains flavors selected from natural flavors, botanical flavors and mixtures thereof. As used herein, the term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

As used herein, the term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, kola, tea, and the like. Botanical flavors can be derived from natural sources such as essential oils and extracts, or can be synthetically prepared.

As used herein, the term "aqueous essence" refers to the water soluble aroma and flavor materials which are derived from fruit juices. Orange aqueous essence is the material which is recovered from the evaporation of orange juice during concentration. The aqueous essences can be fractionated, concentrated or folded essences, or enriched with added components.

As used herein, the term "essence oil" refers to the oil or water insoluble fraction of the aroma and flavor volatiles obtained from juices. Orange essence oil is the oily fraction which separates from the aqueous essence obtained by evaporation of orange juice. Essence oil can be fractionated, concentrated or enriched.

As used herein, the term "peel oil" refers to the aroma and flavor materials obtained by extraction or pressing of the citrus fruit peel. Peel oil and essence oil derived from oranges and other citrus fruits is largely composed of terpene hydrocarbons, e.g. aliphatic aldehydes and ketones, oxygenated terpenes and sesquiterpenes.

JUICE COMPONENT

Any juice can be used to make the beverage of this invention. For example, apple, cranberry, pear, peach, plum, apricot, nectarine, grape, cherry, currant, raspberry, gooseberry, blackberry, blueberry, strawberry, lemon, orange, grapefruit, tomato, lettuce, celery, spinach, cabbage, watercress, dandelion, rhubarb, carrot, beet, cucumber, pineapple, custard-apple, cocona, pomegranate, guava, kiwi, mango, papaya, banana, watermelon and cantaloupe can be used. Preferred juices are the citrus juices, and most preferred is orange juice. Of the non-citrus juices, apple, pear, cranberry, strawberry, grape and cherry are preferred.

The beverage or beverage concentrate compositions herein can be made from an all-natural product. Although the following description of the process of this invention is described with particular reference to making an orange juice concentrate, it will be understood that the process is not limited thereto. Thus, the process is equally applicable to other fruit juices, e.g., pear, cranberry and grape juices, as well as vegetable juices.

Extraction of the Juice

The fruit is washed to remove adhering dirt. Washing may be accomplished by dumping the fruit into troughs of moving water, after which they are separated from the water and given a final spray wash. They may also be washed by strong water sprays as they move along a roller-type conveyor. The fruit is preferably sorted to remove all partially or wholly decayed fruit.

The juice is generally pressed or squeezed from washed fruit. The peel, rag, seeds and large pulp, citrus membrane or cellulosic materials are then removed in a finishing step, if necessary. Undeveloped seeds and sensible pulp are removed in the finisher. Preferably, the squeezing is accomplished under conditions designed to minimize oxidation, i.e., in an inert atmosphere.

The methods for expressing juice by pressing and enzymatic treatment are more fully described in Nelson et al., *Fruit and Vegetable Juice Processing Technology*, AVI Publishing Co., pp 216–229 (1980).

The raw juice from fruits such as oranges, lemons, and tomatoes, as it comes from the extractor or squeezing process contains pulp and seeds. These are separated from the juice in a "finisher". The finisher contains a screen which removes the pulp and seeds from the juice. The screen opening size can range from about 0.1 mm to about 2.5 mm. When the screen opening is larger than 2.5 mm, small seeds pass into the juice and contaminate it.

In order to maintain the quality and freshness of the juice, the temperature is preferably not higher than about 25° C. Temperatures much above 25° C. can cause juices to brown more rapidly or to develop off-flavors.

In order to preserve the aroma and flavor of the juice and to minimize the activity of enzymes present in the juice, the juice should be held for as short a time as is possible before it is sterilized. Preferably the time from squeezing the juice through sterilization is less than 15 minutes. The exact time will depend upon the size of the equipment and the efficiency of the sterilization unit.

A nectar can be produced by mixing from 35% to 55% juice and naturally or artificially sweetened water to make a product with a concentration of about 11° Brix or more.

If a beverage concentrate is desired, the fruit juice is concentrated by conventional means to from about 20° Brix to about 80° Brix. The juice can also be concentrated by evaporation or freeze concentration. Conventional evaporators of the ascending or descending film type, evaporators combining the ascending and descending film feature, multiple tube evaporators, plate type evaporators, expanding flow evaporators, and centrifuged evaporators, etc. can be used.

Evaporation economically removes water to increase the concentration of the juice to 40° Brix or higher(-about 40% to about 75% sugar solids). The juice concentrate can be stored safely at reduced temperatures at these elevated concentrations. In addition, the evaporation step collects any aroma and flavor materials which are present in the juice, i.e. aqueous essence and essence oils. This is a conventional method or producing essences. Evaporation should be carried out in a manner that artificial, cooked or manufactured flavors are minimized or totally eliminated.

A multi-stage, multi-effect vacuum evaporator such as the TASTE (thermally accelerated short time evaporator) can be used. The temperature profile is preferably controlled so that the maximum juice temperature is about 40° C. to about 90° C. A noticeable "cooked" flavor develops in juice concentrate even with the short residence time of these evaporators when the juice exceeds this temperature range. The evaporators can be operated using either forward flow or mixed flow.

Newer types of evaporators such as the narrow bore ascending liquid column evaporator, Sigma Star (available from Schmidt GmbH., Bretten, Germany), are preferably applied. Also, a wiped film evaporator with the condenser built directly into the center of the wiped film evaporator, as in the short path evaporator manufactured by Leybold-Heraeus, Hanau, Germany for oil separation/distillation, is preferably applied.

Other means of concentrating juice can be used. These would include reverse osmosis, sublimation concentration, freeze drying or freeze concentration. Economically, however, it is better to use an evaporation technique.

The evaporator volatiles can be added back to the concentrated product in the blend tank. If the water content of the evaporator volatiles is high, or if the evaporator volatiles are to be stored, then it is more economical to concentrate the evaporator volatiles, e.g. by conventional rectification processes.

The evaporated concentrate is cooled and can either be pumped to a blend tank and mixed with other components of the product or further chilled to about −18° C. and stored in tanks and drums under the inert gas atmosphere such as nitrogen or carbon dioxide. These storage tanks should be shielded from light to prevent light-induced degradation of the concentrate.

The preferred fruit for use herein is oranges. As used herein, "Valencia orange fruit" refers to orange fruit from the genotype or variety Valencia, which usually mature relatively late in the harvest season as compared with other citrus fruit. Examples of suitable Valencia fruit include Florida Valencia fruit, California Valencia fruit, and Brazilian Valencia fruit.

Examples of other suitable orange fruits include the Florida Early-Mid season oranges (Hamlin, Parson Brown and Pineapple), Brazilian varieties such as Pera Rio and Natal, as well as Tangerines, Mandarin Oranges and Blood Oranges.

Other citrus fruits that can be used in this process include grapefruit, lemons, limes, and similar citrus fruits.

Citrus Fiber Feedstock

This feedstock is a dry, flexible, edible, unlimed citrus pulp comprising from about 60% to about 99.99%, preferably from about 68% to about 99.99% citrus juice vesicles or Juice sacs. When seedless citrus fruit is used as a source of the feedstock, there will not be any seed present. However, when the feedstock is from a seed-containing source of citrus fruit, the seed content of the feedstock is generally from about 0.001% to about 0.1%. The seeds are small and usually immature seeds which get entrained in the pulp.

The pulp is screened from the juice using conventional pulp separation equipment, a finisher. This pulp is then preferably washed to recover adhering juice solids and then dried under conditions which minimize oxidation and cooked flavors. Conventional drying techniques are used. These include hot air drying, drum drying, fluid-bed drying and hot oven drying.

The moisture content of the feedstock is reduced to no more than about 18%, preferably no more than about 12%. One way to dry the pulp is by heating with a gas at a temperature in the range from about 120° C. to about 250° C., preferably from about 150.C to about 200° C. When the pulp is unwashed, lower temperatures are used to reduce browning reactions and carmelization of the sugars remaining on the pulp.

Grinding the Pulp

There now follows at least one operation of grinding, optionally with concurrent drying, followed sequentially by a separation technique capable of separating the very fine, low bulk density fiber from the air stream, e.g. a baghouse. The grinding operation takes the dried pulp to a final ultra-fine particle size in the general range from about 50% to about 90% less than 50 microns, preferably from about 60% to about 95% less than 30 microns. This size-reduction operation is achieved by means of a carrier-gas-swept jet mill having an inlet air pressure of about 70 to 100 psig (pounds per square in guage) and an internal design and feed rate sufficient to obtain the desired particle size distribution, followed by an air-solid separation, e.g. a baghouse. The carrier gas has a carrier gas inlet temperature which is less than about 120° C., preferably from ambient (e.g., about 20° C.) to about 80° C. In the jet mill, the carrier gas has a carrier gas inlet flowrate of from about 80 (preferably about 100) cubic feet per pound of chopped feedstock to about 2,000 (preferably about 1,000) cubic feet per pound of chopped feedstock.

Operating outside these temperature limits is found to result in all manner of disadvantages, for instance, operating above the indicated temperatures tends to result in excessive browning, burning and off-flavor generation; operating with insufficient carrier gas inlet flowrate tends to result in insufficient fluidization and grinding of the feedstock and plugging of the mill; operating with excessive carrier gas flow can result in inefficient operation.

Citrus Fiber Product

A very finely sized citrus fiber which has good color and does not have unacceptable off-flavor is produced by the foregoing process. This citrus fiber has a particle size less than 50 microns, and usually in the range from about 60% to about 90% less than 30 microns and a final moisture content of not more than about 10%.

The fiber is characterized by the following physical parameters:

| | |
|---|---|
| Particle Size | less than 50 microns, preferably 60% to 90% less than 30 microns |
| Available Carbohydrates | 9% to 65% |
| Fat | 0% to 2% |
| Soluble Fiber | 6% to 25% |
| Insoluble Fiber | 13% to 74% |
| Total Dietary Fiber | 20% to 85% |
| Total Carbohydrate | 80% to 90% |

The available carbohydrate consists primarily of the monosaccharides, glucose and fructose, and of the disaccharide sucrose which are present in the fiber because of solids adhering to the feedstock. Other available carbohydrates include low molecular weight starches and other hydrolysis products of the fruit.

Total carbohydrate includes all materials containing sugars, including cellulose.

Flavor Component

The particular amount of the flavor component effective for imparting flavor characteristics to the beverages ("flavor enhancing") can depend upon the flavor(s) selected, the flavor impression desired, and the form of the flavor component. The flavor component usually comprises at least 0.002% by weight of the beverage to about 1%. When fruit juice is the flavorant, from about 3% to about 40% is used.

Aroma and flavor volatiles are those compounds which partition from the beverage into the headspace above the beverage. Volatile compounds generally include a low boiling fraction, i.e., a highly volatile fraction, and a high boiling fraction, i.e., a less volatile fraction. Aqueous essence usually contains the highly volatile fraction and essence oil and peel oil contain the less volatile fraction. From about 0.002% to about 1.0% of aqueous essence and essence oil are used in citrus flavored juices.

For most citrus fruit juices, these highly volatile compounds are characterized by having a boiling point less than about 131° C. These highly volatile compounds are generally low molecular weight aldehydes, ketones, alcohols, esters and acids. They also include low molecular weight sulfur compounds (e.g., thiols, sulfides), and low molecular weight nitrogen compounds (e.g., amines, pyrazines, pyridines, etc.). These volatiles include, but are not limited to, acetaldehyde, methanol, ethanol, butanol, hexanal, ethyl butyrate, ethyl acetate, propyl acetate, methyl propyl acetate, butyl acetate, methyl butyl acetate, hexyl acetate and acetic acid.

The lesser volatile fraction comprise those compounds which elute after the highly volatile compounds. In orange juice these compounds have a boiling point above about 131° C. These lesser volatile compounds include terpenes, higher molecular weight alcohols (e.g. linalool), esters, aldehydes (e.g. geranial, octanal, and decanal), ketones and ketoacids.

Sweetener Component

The sweetener composition is usually a monosaccharide or a disaccharide. These include sucrose, fructose, dextrose, maltose and lactose. Other carbohydrates can be used if less sweetness is desired. Mixtures of these sugars can be used.

In addition to sugar, the beverages can contain other natural or artificial sweeteners. Other suitable sweeteners include saccharin, cyclamates, acesulfam-K, L-aspartyl-L-phenylalanine lower alkyl ester sweeteners (e.g. aspartame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 at Brennan et al., issued Aug. 16, 983, L-aspartyl-L-1-hydroxymethyl-alkaneamide sweeteners disclosed in U.S. Pat. No. 4,338,346 to Brand, issued Dec. 21, 1982, L-aspartyl-1-hydroxy-ethylakaneamide sweeteners disclosed in U.S. Pat. No. 4,423,029 to Rizzi, issued Dec. 27, 1983, L-aspartyl-D-phenylglycine ester and amide sweeteners disclosed in European Patent Application 168,112 to J. M. Janusz, published Jan. 15, 1986, and the like. A particularly preferred sweetener is aspartame.

The amount of the sweetener effective in the beverages depends upon the particular sweetener used and the sweetness intensity desired. For noncaloric sweeteners, this amount varies depending upon the sweetness intensity of the particular sweetener, usually from 0.1% to 5%. For sugar (i.e., sucrose), this amount can be from 10% to 85% (typically from 10% to 45%) by weight. In determining the amount of sugar for beverages, any sugar or other sweetener present in the flavor component is also included. Low-calorie sweetener combinations containing a noncaloric sweetener such as aspartame and a sugar, such as corn syrup solids, or sugar alcohols can also be used in beverage mixes. In general, the amount of sweetener will be from about 0.5% to about 85%. The amount of artificial sweetener is from 0.5% to 10%.

Other Ingredients

Other minor ingredients are frequently included in the beverages. Such ingredients include preservatives such as benzoic acid and salts thereof, sulfur dioxide, butylated hydroxyanisole, butylated hydroxytoluene, etc. Colors derived either from natural sources or synthetically prepared can be added.

Salt, e.g. sodium chloride, and other flavor enhancers can be used to improve the flavor of the beverage.

Emulsifiers can also be included in the beverage. Any food grade emulsifier can be used. Edible emulsifiers include mono and di-glycerides of long chain fatty acids, preferably saturated fatty acids, and most preferably, stearic and palmitic acid monoand diglycerides. Propylene glycol esters are also useful in the beverage mixes.

Blending

The flavor materials can be blended in tanks with concentrated juice to make a juice concentrate or with a single-strength juice. If a citrus juice concentrate or beverage is to be made, whole pulp, at least 0.85 mm in size, can also be added. This pulp is sensible pulp. From 0% to 4% (w/w) is used.

Adding Fiber to Juice

Citrus pulp fiber s added to conventionally extracted single-strength juice. This juice may be the primary Juice from a FMC extractor or may be a juice obtained by finishing and/or pasteurizing or homogenizing a juice. In yet another variation, the citrus fiber may be added to concentrated fruit juice.

A particularly desirable embodiment for maximizing the overall citrus pulp fiber content of a citrus juice results when the citrus pulp fiber is added to a single-strength citrus juice comprising high-shear homogenized background pulp. The addition of the finely divided citrus fiber of the invention is conducted at low-shear and is not followed by any further high-shear operations prior to packing and distributing the single-strength juice product.

The present invention encompasses various fiber-supplemented juices and beverages. Such beverages enscompass single-strength citrus juice and concentrated citrus juice. Single-strength juice typically can be in two grades, one having a Total Dietary Fiber content (AOAC / Prosky) of from about 0.7 to about 1.2 grams per serving and a grade having a Total Dietary Fiber content of from about 1.25 to about 3 grams per serving. Up to 4 gm of fiber can be added without making a gelled product. However, in the 2 gm to 4 gm range, the product will be more viscous.

The pulp fiber is added before adding the pulp. It is important to mix the fiber with minimal shear to avoid increasing the viscosity of the beverage. Temperatures below 150of (65° C.) and preferably of from 34° F. (1° C.) to 80of (27° C.) are best.

The pulp fiber is mixed with the juice for a short time interval at minimal mix speeds to keep the fiber from gelling. It is important to add the fiber slowly to prevent clumping and to help the even distribution of fiber in the juice. When adding fiber to concentrates, a folding action is used. The fiber is sprinkled into the concentrate and folded or mixed with a low shearing action.

Packaging

The juice or juice concentrate is then packaged to insure long-term stability. Preferably, the packaging materials should be impervious to oxygen and damaging light radiation. Optionally, the concentrate can be packed under an inert gas to minimize the oxygen content of any container headspace.

The product is kept at a temperature of 10° C. or less during long-term storage. Preferably, frozen juices at a temperature of from −20° C. to −80° C.

Viscosity Measurement

A Brookfield viscometer, model LVT, equipped with a UL adapter, fitted with a ULA cylindrical spindle is used.

| | |
|---|---|
| Volume of samples analyzed: | 16 ml |
| Operating temperature: | 8° C. |
| Operating Pressure: | Ambient |
| Operating Speed (rpm): | 12 |

Into the sample cup of a UL-adaptor is poured 16 ml. of a viscosity standard (known viscosity of 5 to 10 centipoise). A Brookfield LVTD rotational viscometer is set up with the UL-adaptor being placed in a 25° C. waterbath. The viscosity standard in the sample cup is allowed to equilibrate in the waterbath for 10 minutes before a reading is taken at 12 rpm. The known viscosity of the viscosity standard is divided by the average dial reading at 12 rpm to determine the response factor.

Sensible pulp is removed from the juice sample by passing it through a 20 mesh screen (for concentrate products, water is added to dilute the juice sample to 11.8° Brix prior to pulp removal). Into the sample cup of the UL-adaptor is poured 16 ml. of the screened sample. The UL-adaptor of the viscometer is placed in an 8° C. waterbath. The screened juice sample is allowed to equilibrate in the waterbath for 15 minutes before a reading is taken at 12 rpm. The viscosity of the juice sample at 12 rpm is determined by multiplying the dial reading by the response factor.

The fiber is analyzed by the following methods:

Method References

Protein (N×6.25)

Official methods of analysis (1984) 14th edition, method 2.057, AOAC, Arlington, Va.

Moisture. 100 degree vac. oven

Official methods of analysis (1984) 14th edition, method 16.259, AOAC, Arlington, Va.

Fat

Official methods of analysis (1984) 14th edition, method 7.063, AOAC, Arlington, Va.

Ash

Official methods of analysis (1984) 14th edition, method 14.006, AOAC, Arlington, Va.

Crude Fiber

Official methods of analysis (1980) 13th edition, method 7.061-7 065, AOAC, Washington, D.C. Total Dietary Fiber Determination of total dietary fiber in foods, food products and total diets; interlaboratory study presented to 97th International meeting of the A.O.A.C. 1983 Prosky, ASP, Furda, Devries Schweizer and Harland.

Official methods of analysis (1985) 14th edition, first supplement, page 399.

Carbohydrates

Composition of foods, agriculture handbook #8, page 164, United States Department of Agriculture. Available carbohydrate is determined by subtracting total dietary fiber from total carbohydrates.

Calories

Composition of foods, agriculture handbook #8, pages 159-160, United States Department of Agriculture.

Calories (using TDF)

Composition of foods, agriculture handbook #8, pages 159-160, United States Department of Agriculture.

Sugar Profile

Mason, S. and Slover, H., J. Agr. Food Chem., vol. 19, no. 3, 1971, pp 551-554.

Brobst, K. Methods in Carbohydrate Chemistry, Vol. 6, pp. 3-8, Academic Press, N.Y., N.Y. (1972).

Insoluble Dietary Fiber

Official methods of analysis (1985) 1st supplement, 14th edition, page 399.

Soluble Dietary Fiber

Soluble dietary fiber is calculated by difference. Total dietary fiber less insoluble dietary fiber equals soluble dietary fiber.

Starch Enzymatic Enzymatic Hydrolysis—Official methods of analysis (1984) 14th edition, method 14.073, AOAC, Arlington, Va. Li, et al, J. Agric. Food Chem. 1985, 33, 531-536.

Determination —Official methods of analysis (1984) 14th edition, method 31.053 and 31.031, AOAC, Arlington, Va.

The following non-limiting example illustrates the methods and compositions of the present invention. The juices can also be carbonated.

EXAMPLE I

Unwashed cirtus pulp fiber prepared by jet milling dried pulp from Valensia oranges (Sample I) and early, mid-oranged (Sample II) at 90 psig and 150° C. has the following analysis:

| Ingredient | Sample I Percent | Sample II Percent |
|---|---|---|
| Protein (based on nitrogen) | 7.7 | 6.6 |
| Moisture | 2.9 | 2.1 |
| Fat | 1.6 | 1.6 |
| Ash | 3.4 | 3.3 |
| Crude fiber | 8.7 | 7.8 |
| Total dietary fiber | 26.7 | 24.2 |
| Carbohydrates - total | 84.4 | 86.4 |
| Fructose | 12.6 | 13.4 |
| Glucose | 10.6 | 11.8 |
| Sucrose | 25.9 | 28.0 |
| Insoluble dietary fiber | 12.8 | 11.3 |
| Lignin | 3.8 | 2.8 |

Analysis by a Malvern 2600 particle size analyzer (laser diffraction) shows 90% of the particles are less than 40 microns.

An orange juice produce is prepared as follows:

| Ingredient | Percent |
|---|---|
| Orange juice concentrate (63.5° Brix) | 17.8 |
| Pulp (pasteurized) | 2.7 |
| Fiber | 1.6 |
| Aqueous Essence | 0.4 |
| Essence oil | 0.001 |
| Deterpenated peel oil | 0.0015 |
| Water | Remainder |
| Peel oil | 0.007 |

The citrus pulp fiber material is added to water in an Osterizer Pulse-Matic 16 at the lowest setting (stir).

This solution/suspension is then added to orange juice concentrate and the essence and oils are added. The Brix is 12.3. The viscosity of the single-strength juice at 8° C. is 23.8. The same juice without fiber has a viscosity of 8.1.

EXAMPLE II

A citrus pulp fiber made from washed pulp is added to orange juice (single strength, about 12.70 Brix and 7.9 cps viscosity).

The juice has the following composition:

| Ingredient | Percent |
| --- | --- |
| Orange juice | 98.398 |
| Sensible pulp | 0.90 |
| Fiber | 0.70 |
| Orange oil | 0.002 |

The fiber is prepared by Jet milling washed pulp with a moisture content of 12%. The jet milled fiber has a particle size of less than 50 microns. The composition of the fiber is:

| Ingredient | Percent |
| --- | --- |
| Total dietary fiber (Prosky Method) | 76 |
| Soluble fiber | 22 |
| Insoluble fiber | 54 |
| Available carbohydrate | 9 |
| Protein | 10 |
| Fat | 2 |
| Ash | 3 |

The fiber is added as the juice passes through a tri-blender pump (Tri-Clover, Inc., Model F2116 MDS, 2.5 HP motor]. The orange oil and pulp are then added to the juice as it is slowly agitated in a blend tank. The juice is pasteurized by passing it through a high-temperature, short-time (HTST) heat exchanger (190of, 10 seconds). The Brix of this pasteurized, singlestrength juice is 12.8. The viscosity at 8° C. is 10.9 cps.

What is claimed is:

1. A beverage comprising:
    a) from about 0.5% to about 6.5% dried citrus pulp fiber having a particle size of less than 50 microns, said fiber being derived from citrus pulp comprising from about 60% to about 99.9% citrus juice vesicles, and having a moisture content less than 18%, and a total dietary fiber content of 40–80%;
    b) from about 5% to about 99.5% juice;
    c) from 0% to 60% added sweetners; and
    d) the remainder being water.

2. A beverage according to claim 1 additionally comprising from about 0.002% to about 3% flavor and wherein said fiber is from 0.5% to 2.6%.

3. A beverage according to claim 1 wherein said fiber consists essentially of:
    (a) from about 6% to about 25% soluble fiber;
    (b) from about 13% to about 74% insoluble fiber;
    (c) from about 9 to about 65% available carbohydrates selected from the group consisting of fructose, glucose and sucrose;
    (d) less than 2% fat; and
    (e) from 20% to 80% total dietary fiber.

4. A beverage according to claim 3 wherein said juice is selected from the group consisting of citrus juices, apple juice, pear juice, cranberry juice and mixtures thereof.

5. A beverage according to claim 4 wherein said juice is selected from the group consisting of orange juice, lemon juice, grapefruit Juice and mixtures thereof.

6. A beverage according to claim 5 wherein said juice is orange juice.

7. A beverage according to claim 6 having from 0% to about 4% (w/w) sensible pulp.

8. A beverage according to claim 7 where said fiber is derived from orange cellulosic material.

9. A beverage according to claim 8 wherein 60% to 90% of the particles of said fiber are less than 30 microns.

10. A beverage according to claim 9 comprising from 0.5% to 2.6% fiber.

11. A beverage according to claim 10 wherein said flavor is orange oil.

12. A beverage according to claim 10 wherein said flavor is orange essence and essence oil.

13. A beverage concentrate comprising:
    (a) from about 2.0% to about 15% citrus fiber having a particle size of less than 50 microns, said fiber being derived from citrus cellulosic materials and having a total dietary content of from about 40 to about 80%;
    (b) from about 10% to about 99% juice having a concentration of from 35o to 80o Brix;
    (c) from 0% to about 60% sweetener; and
    (d) the remainder being water.

14. A beverage concentrate according to claim 13 additionally comprising from about 0.002% to about 3% added aqueous and oil essences or other flavorants.

15. A beverage concentrate according to claim 14 wherein said fiber consists essentially of:
    (a) from about 6% to about 25% soluble fiber;
    (b) from about 13% to about 74% insoluble fiber;
    (c) from about 9 to about 65% carbohydrates selected from the group consisting of fructose, glucose and sucrose;
    (d) less than 2% fat; and
    (e) from about 80% to about 90% total carbohydrate.

16. A beverage concentrate according to claim 15 wherein said juice is selected from the group consisting of citrus juices, apple juice, pear juice, cranberry juice and mixtures thereof.

17. A beverage concentrate according to claim 16 wherein said juice is selected from the group consisting of orange juice, lemon juice, grapefruit juice and mixtures thereof.

18. A beverage concentrate according to claim 17 wherein said juice is orange juice.

19. A beverage according to claim 18 where said fiber is derived from orange pulp.

20. A process for making a beverage comprising:
    (a) adding from about 0.5% to about 6.5% citrus fiber having a particle size of less than 50 microns to from about 10% to about 99% juice by mixing at below temperature 65° C. with minimal shear;
    (b) adding aroma and flavor volatiles to the fiber containing juice to produce a beverage.

* * * * *

UNITED STATES PATENT AND TRADEMARK OFFICE
CERTIFICATE OF CORRECTION

PATENT NO. : 5,162,128
DATED : November 10, 1992
INVENTOR(S) : Mills et al.

It is certified that error appears in the above-identified patent and that said Letters Patent is hereby corrected as shown below:

Column 12, line 8, "Juice" should read --juice--

Column 12, line 31, "35o to 80o" should read --$35^0$ to $80^0$--

Signed and Sealed this

Twelfth Day of October, 1993

Attest:

BRUCE LEHMAN

Attesting Officer

Commissioner of Patents and Trademarks